A. F. HUSSANDER.
SEAT AND CUSHION CONSTRUCTION.
APPLICATION FILED AUG. 16, 1919.
1,368,397.
Patented Feb. 15, 1921.
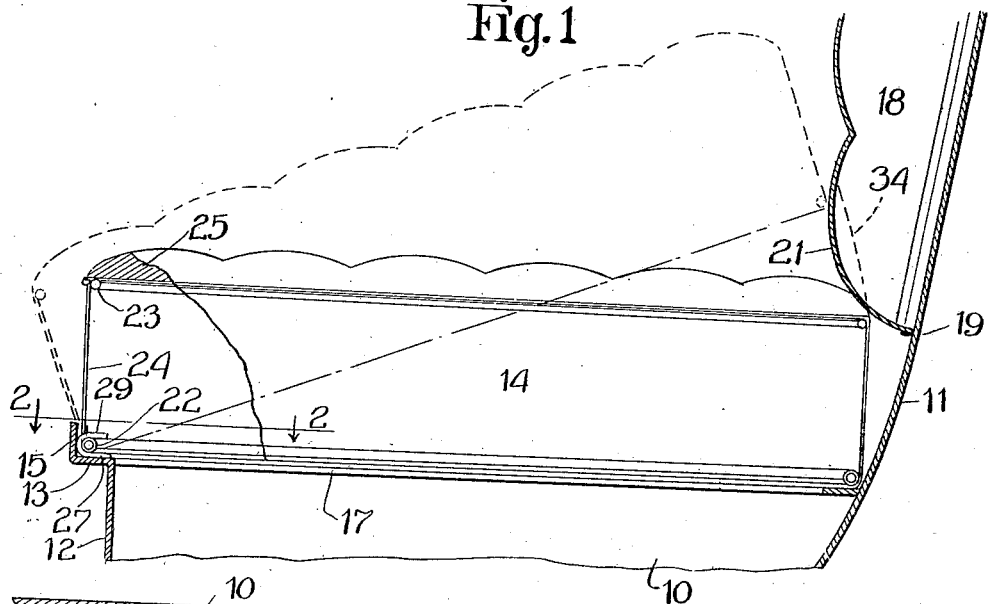
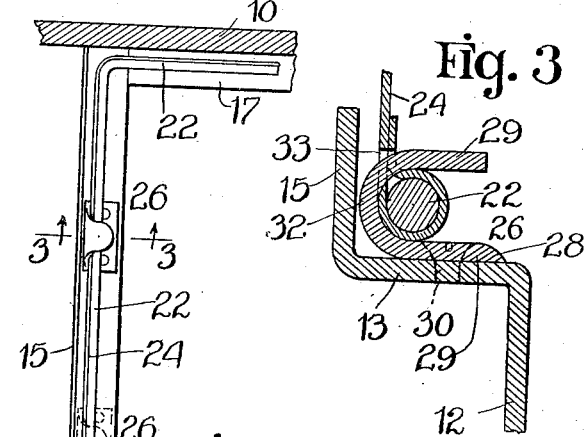
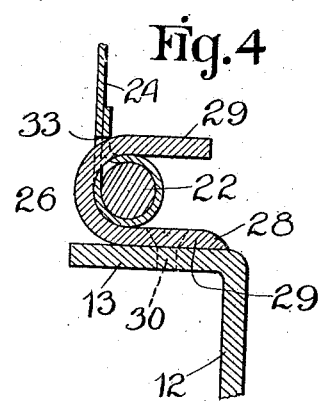
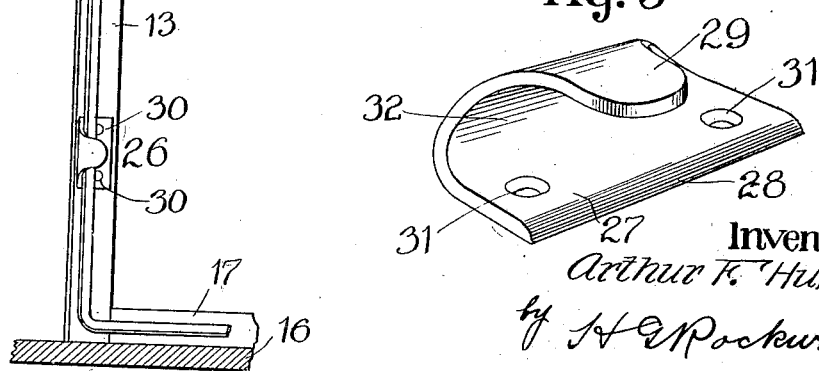
Inventor
Arthur F. Hussander
by H. E. Rockwell
Atty

UNITED STATES PATENT OFFICE.

ARTHUR F. HUSSANDER, OF CHICAGO, ILLINOIS.

SEAT AND CUSHION CONSTRUCTION.

1,368,397.  Specification of Letters Patent.  Patented Feb. 15, 1921.

Application filed August 16, 1919. Serial No. 317,848.

*To all whom it may concern:*

Be it known that I, ARTHUR F. HUSSANDER, a citizen of the United States, residing in Chicago, in the county of Cook and State of Illinois, have invented certain new and useful Improvements in Seat and Cushion Constructions, of which the following is a specification.

My invention relates to seat and cushion construction, and is primarily adapted for use in automobiles to prevent casual dislodgment of seat cushions from their seats, incident to jolting of the automobile. The invention is, however, adaptable to railroad passenger cars, chairs, and similar articles.

A further object lies in the provision of a construction improved as just recited, and wherein the seat cushion is readily inserted in place or removed. Another object is to provide an improved construction of seat and cushion whereby certain economies may be practised in the manufacture of automobiles while conforming very closely to the present standards of seat and cushion construction.

Other objects and advantages of the invention will appear from the following description, taken in conjunction with the accompanying drawings, which form a part of this specification and illustrate the preferred embodiment of the invention.

In the drawings:

Figure 1 is a vertical, approximately central, section through the rear portion of an automobile body, the section being taken on a plane paralleling the direction of travel of the machine; an adjusted position of the seat-cushion is illustrated in dotted lines.

Fig. is a fragmentary section taken on line 2—2 of Fig. 1, with the upper part of the cushion broken away; in dotted lines in this figure is illustrated a modification of the invention.

Fig. 3 is a section on line 3—3 of Fig. 2.

Fig. 4 is a section similar to Fig. 3, illustrating a modification.

Fig. 5 is a view in perspective of a preferred form of hook employed.

It is a common experience of the automobile driver to find, after a trip over rough roads, that the back seat cushion has been jolted from its position on the back seat, and lies on the floor of the car between the front and back seats. The present invention is adapted to prevent such occurrences.

Referring to Fig. 1, the right-hand side of an automobile body is designated by numeral 10, 11 indicating the back of the body, and 12 the upright sheet of metal forming the support for the forward edge of the rear seat. It is customary, in the construction of the modern automobile body, to form the sheet 12 with a horizontal and forwardly bent portion 13, upon which the seat cushion, generally indicated at 14, rests; and it is customary, also, to provide an upturned flange 15 on the forward edge of the horizontal portion 13 of sheet 12, flange 15 normally extending the whole length of the forward edge of the vehicle seat and being approximately three-quarters of an inch in height. The intended function of flange 15, in the ordinary automobile body, is to retain the seat cushion 14 in place upon its seat by preventing it from shifting forward. However, this function is not adequately accomplished in the ordinary construction, inasmuch as the jolting caused by rough roads frequently elevates the forward edge of the seat cushion above the upper edge of flange 15 while at the same time thrusting the seat cushion forwardly on its seat.

A seat-forming angle-iron 17 is normally provided at each side of the ordinary automobile body, having one of its webs horizontally positioned on a level with the rest 13. The rest 13 and the angle-iron 17 form the seat for support of the seat cushion 14. At 18, in Fig. 1, is indicated the stuffed back cushion customarily provided in automobile bodies and fixedly attached to the back 11. According to present standards of construction, the fixed back cushion 18 has its lower edge 18 spaced above the seat level defined by members 13 and 17, and its yielding, stuffed portion 21 projecting forwardly and upwardly from its lower edge, as shown in Fig. 1. In connection with this arrangement, the seat cushion 14 is of such depth from front to back as to position its rear portion well beneath the stuffing 21 of the back cushion so that, with the forward portion of the seat cushion being held against forward horizontal movement by contact with flange 15, casual elevation of the rear portion of the seat is prevented. The yielding character of the stuffing 21 of the back cushion, however, permits the rear edge of the back cushion to be forced out of or into the full-line position of Fig. 1.

The ordinary automobile cushion comprises a lower, substantially rectangular, heavy frame wire 22; a similar upper frame wire 23 spaced above the lower one; and stuffing 25 on the top of the cushion. Of course there are the ordinary springs, not shown, which force the frame wires 22 and 23 apart to the limit of extension of the soft leather panel 24.

As a means for preventing elevation of the forward portion of seat cushion 14 until the rear portion thereof has been removed from contact with the back cushion, I provide one or more hooks, generally indicated at 26, and attached to the forward transverse rest portion 13 of the seat. These hooks are U-shaped in cross-section, with the opening of the U pointing backward; and each comprises a base-plate 27, the rear edge 28 of which is beveled, and a finger 29 narrower than the base-plate, so that fastening screws 30 may be readily set in corner apertures 31 provided in the base-plate. Preferably, the portions 27 and 29 are joined by a cylindrically-curved part 32. A hook-receiving aperture 33 is cut in the soft leather panel 24 of the seat cushion, just above the frame wire 22.

In the operation of the invention, and considering the parts assembled as shown in full lines in Fig. 1, the rear portion of seat cushion 14 is pulled upward against the resistance of the stuffing 21 of the back cushion, that stuffing yielding along a dotted line, indicated at 34, to permit passage of the rear part of the seat cushion. After the rear portion has been elevated to the dotted-line position of Fig. 1, the lower portion of the cushion may be pushed slightly backward to disengage the frame wire 22 and the leather panel 24 from engagement with the fingers 29 of the hooks, and the cushion is free for removal from the seat. In placing the cushion in position on its seat, the reverse of this operation is performed, the forward portion of the cushion being laid upon the seat rearwardly of the fingers 29, and drawn forward till fingers 29 pass through their apertures 33 and lower frame wire 22 is inserted in the cylindrical portion of the hooks; whereupon a slight pressure on the rear portion of the seat cushion will force that portion past the stuffed portion 21 of the back cushion, and down onto the seat. It will be noted that, because of the cylindrically curved portion 32 of the hooks, the lower frame 22 of the seat cushion, regardless of its cross-sectional contour, will pivot freely within the hooks. During travel of the automobile, the fingers 29 of the hooks prevent forward or upward movement of the front portion of the seat cushion, while contact between the rear portion of the seat cushion and the stuffing 21 of the back cushion prevents casual elevation of the rear part of the seat cushion, and also prevents such backward shifting of the seat cushion as would bring frame 22 out from under the fingers 29. Thus, the seat cushion is held in place regardless of the roughness of the road traveled, and yet is readily removable. The beveling of the rear edge 28 of plate 27 aids the operator in inserting the frame wire 22 into the hooks.

In full lines in Fig. 2 are shown two hooks 26 spaced from each other, and also spaced equal distances from the sides 10 and 16 of the automobile body. If the seat cushion 14 is of such length that it fits snugly between the sides 10 and 16, the advantages of this invention may be secured by use of a single hook, 26, as indicated in dotted lines in Fig. 2.

The function, heretofore performed by the upstanding flange 15, of preventing forward horizontal movement of seat cushion 14, is perfectly accomplished by the hooks 26 of this invention, and therefore the flange 15 comprises waste metal where my invention is employed; hence, it may be eliminated, as illustrated in Fig. 4, thus reducing the amount of metal necessary in the manufacture of automobile bodies, and consequently somewhat lessening the weight of the body and the cost of manufacture.

I claim:

1. The combination with a substantially horizontal seat, and an upstanding back rigidly related thereto, of a yieldable back cushion having its lower portion spaced above said seat, fixedly secured to said back and extending forwardly and upwardly therefrom, a backwardly-opening U-shaped hook fixed to the forward portion of the seat, and a seat cushion comprising a lower frame member insertible in said hook; said seat cushion being of such depth from front to back that its rear portion lies below and in frictional engagement with the lower portion of said back cushion.

2. In a vehicle, the combination with the sides thereof, of a seat back joining said sides, an upstanding sheet of metal spaced forwardly of and substantially paralleling said back, the upper edge of said sheet being bent horizontally to form the forward portion of a seat, means associated with said horizontally-bent portion to complete a substantially horizontal seat, a backwardly-opening U-shaped hook fixed to said forward portion of the seat, a yieldable back cushion fixed to said back and projecting forwardly thereof in spaced relation to the sheet, and a seat cushion comprising a lower frame member horizontally traversing the vehicle body and inserted in said hook for pivotal movement therein; said seat cushion extending backwardly into frictional engagement with the back cushion.

3. The combination of a seat provided at its forward edge with a rearwardly opening hook, a cushion provided at its forward edge with means adapted to be pivotally engaged with said hook, said means being detachable from the hook upon rearward movement of said cushion, and means disposed rearwardly of said cushion for preventing accidental rearward or upward movement of the rear edge of said cushion whereby accidental disengagement of the cushion from said hook is prevented.

4. The combination with a seat, of a seat cushion comprising a frame, means mounted on the forward portion of said seat in position to coöperatively engage with said frame to lock the forward edge of the seat cushion against upward and forward movement, said cushion being disengageable from said means upon rearward movement of the seat cushion, means disposed rearwardly of said seat cushion for preventing rearward movement of the cushion, and a back cushion yieldably engaging the upper rear edge of said seat cushion whereby accidental upward movement of said cushion is prevented.

ARTHUR F. HUSSANDER.